July 28, 1931. J. B. STRAUSS 1,815,935
RECONNOITERING DEVICE
Filed July 24, 1922 3 Sheets-Sheet 1
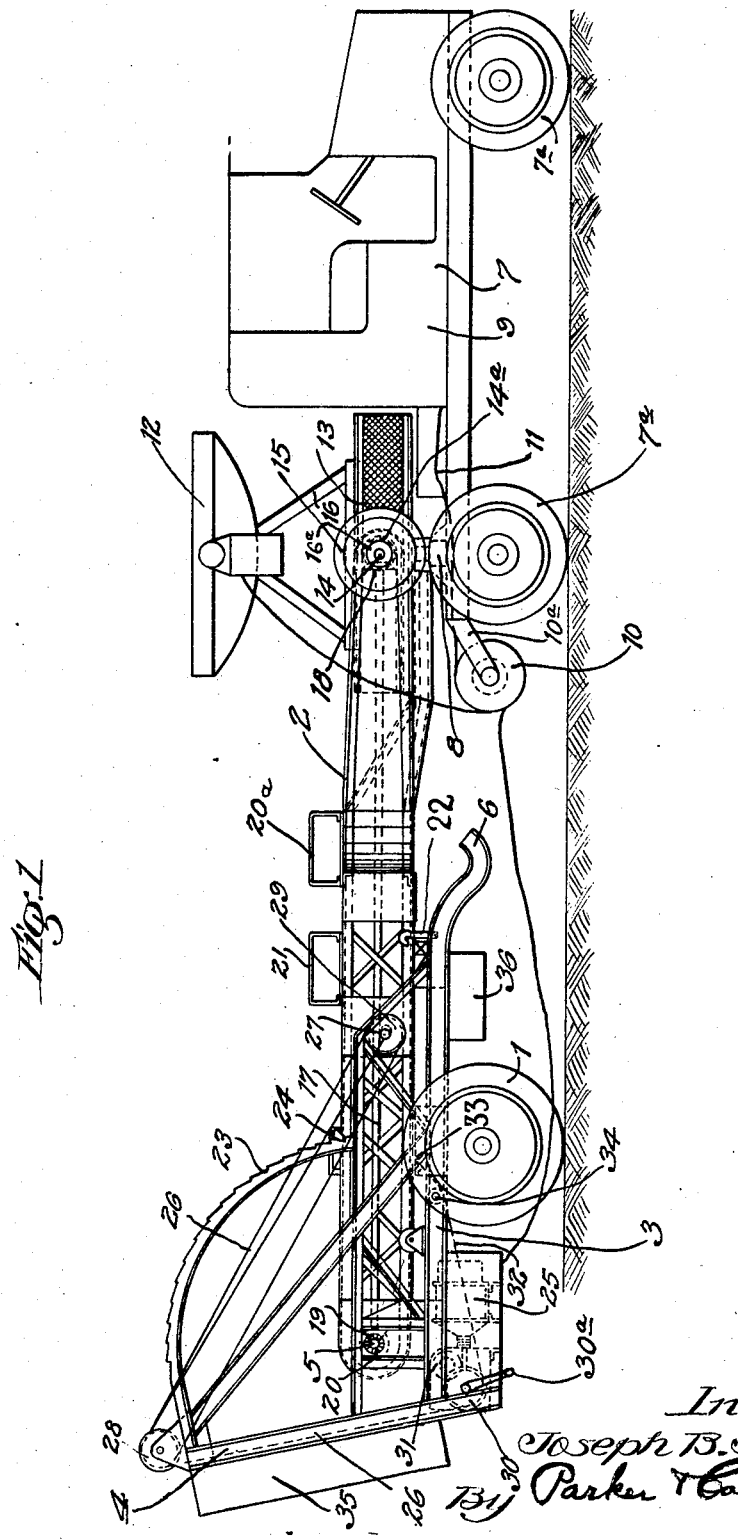

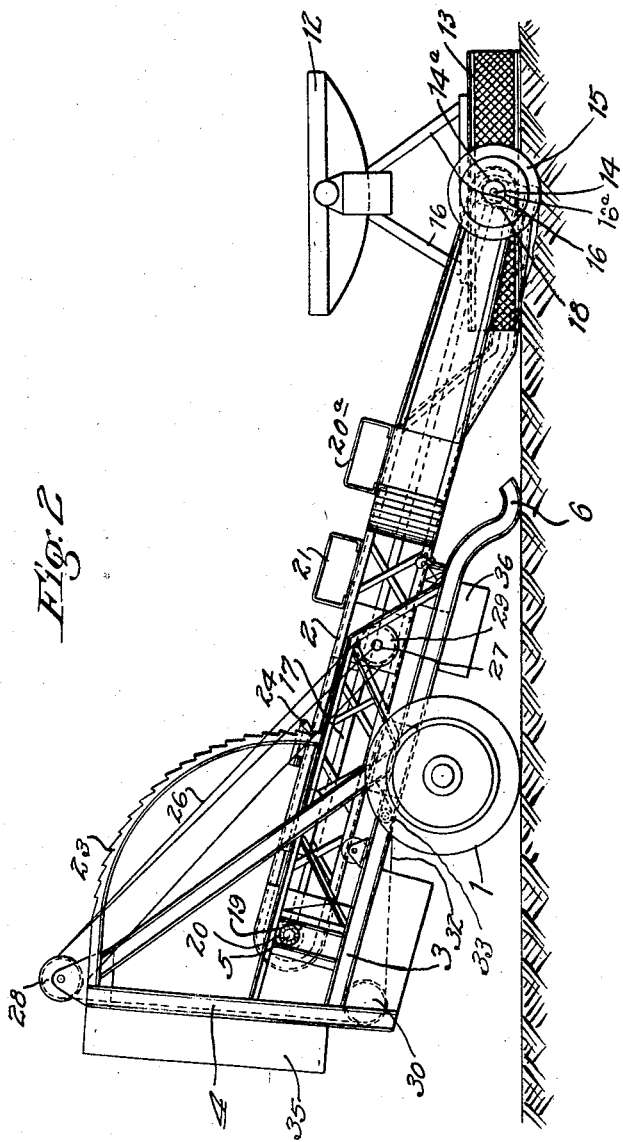

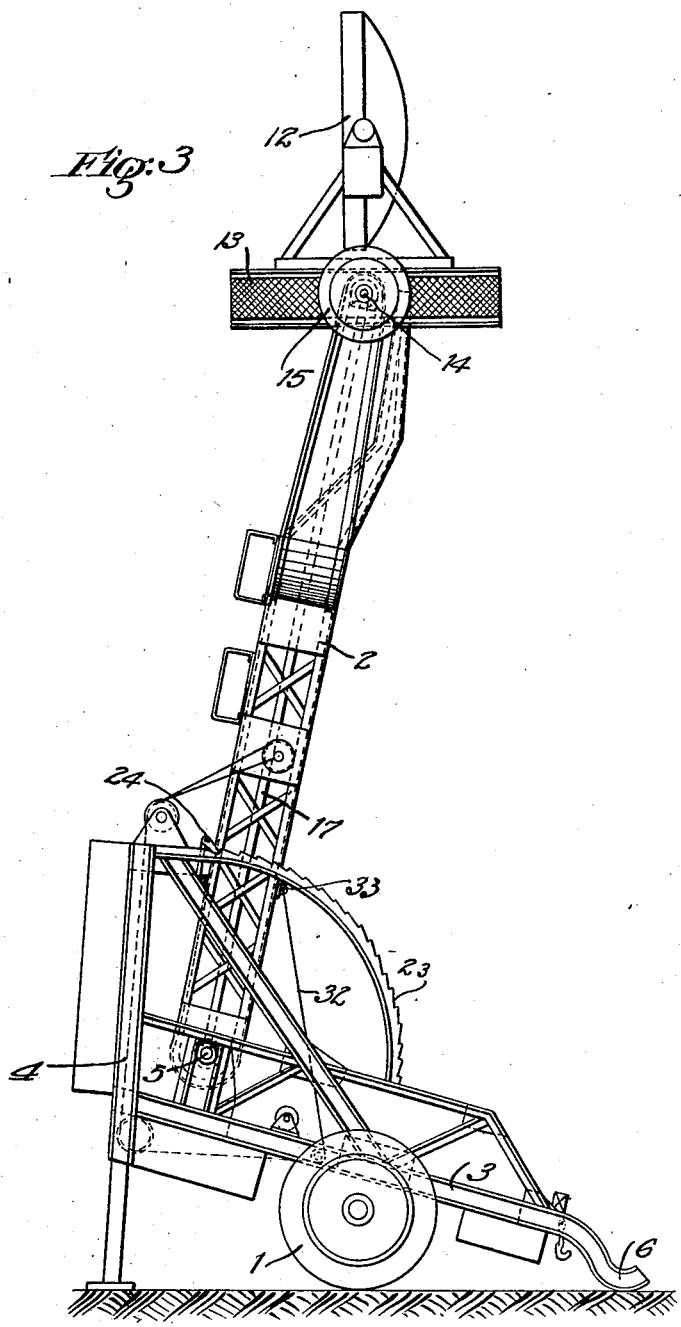

Patented July 28, 1931

1,815,935

UNITED STATES PATENT OFFICE

JOSEPH B. STRAUSS, OF CHICAGO, ILLINOIS

RECONNOITERING DEVICE

Application filed July 24, 1922. Serial No. 577,058.

This invention relates to improvements in reconnoitering apparatus and has for its object to provide a new and improved device of this description by means of which an observation tower may be easily and quickly transported from point to point and then set up and manipulated to make observations. The invention has other objects which are more particularly pointed out in the accompanying description.

Referring now to the accompanying drawings

Fig. 1 is a view showing one form of device embodying the invention in position for being moved from point to point;

Fig. 2 is a view showing the observation tower with the observation platform on the ground;

Fig. 3 is a view showing the observation tower lifted;

Like numerals refer to like parts throughout the several figures.

In the construction shown I provide rear wheels 1, upon which the observation tower 2 is mounted. These wheels carry a frame 3 having two separated upwardly projecting members 4. The observation tower 2 is pivoted at 5 upon the supporting frame 3. The frame 3 has a forwardly projecting part 6 which is preferably bent downwardly so as to form a supporting member in engagement with the ground or other surface upon which the wheels 1 rest, when the end of the tower is disconnected from the power element 7.

This power element may be of any suitable form, and is mounted upon wheels 7ª, and the end of the tower 2 is connected thereto by a king pin 8. This pin permits pivotal movement, and when it is removed the tower is disconnected from the power element and this power element may then be moved to a distant point. The power element is provided with an electric generator 9 for generating a current and it is also provided with a reel 10. A cable or electric conductor 11 connected with the generator is wound upon the reel 10 and is connected with the electric light 12 mounted on the platform 13 of the tower. This platform is pivotally connected with the tower in any desired manner. I prefer to use a shaft 14. There are preferably wheels 15 at the end of the tower which bear upon the ground when the tower is disconnected from the power element. The reel 10 is rotatably mounted upon the rearwardly and downwardly projecting parts 10ª connected with the frame and the power element. The lamp 12 is mounted upon pivots 15 on the supports 16 connected with the platform 13. The platform 13 is kept in a substantially horizontal position during all the various positions of the tower 2. This result is secured in the construction shown by providing the shaft 14 with a beveled gear 16ª. There is a longitudinal shaft 17 extending along the tower which has a beveled gear 18 engaging the beveled gear 16ª on the shaft 14. The shaft 17 has at the other end a beveled gear 19 which engages a beveled gear 20 upon the pivot or shaft 5 upon which the tower is mounted on the frame 3. The beveled gear 20 is stationary and as the tower is lifted the beveled gear 19 moves about the shaft 5 and is rotated by its engagement with the gear 20, and this rotates the shaft 17 and the gear 18. The gear 18 by its engagement with the gear 16ª rotates the latter gear and the shaft 14 and the parts are so proportioned as to keep the platform 13 always in a substantially horizontal position.

The tower is provided with seats 20ª and 21 for some of the men while the device is being transported. The end of the frame 3 is connected to the tower when the device is being transported by means of the safety hook 22. A safety device is provided for preventing the fall of the tower which consists of the rack 23 on the frame 3 and the pawl 24 mounted on the tower.

The tower is lifted and lowered in any desired manner, as by means of a motor 25 mounted on the frame 3. A cable 26 is connected at 27 to the tower and passes over a pulley 28 on the frame and then over a pulley 29 on the tower, and then down at the rear to a winding drum 30, this winding drum being operated by the motor 25 through suitable speed reduction apparatus 31.

It will be seen that when the motor is operated to wind the cable 26, the tower will be lifted, and when it is rotated to unwind the cable, the tower will be lowered. There may be a plurality of these cables 26. There is also a steadying cable 32 which is fastened at 33 to the tower and which also passes to the drum 30, this steadying cable passing over a pulley 34 on the frame. At the rear of the frame is a receptacle 35 for extra mirrors or glass for the searchlight.

A tool box 36 is connected with the frame 3. In the use of the device the tower is connected to the power element 7 when it is desired to move the device from place to place. When it is desired to use the tower it is disconnected from the power element 7, and if it is desired to use it on the ground the part 6 of the frame is let down to engage the ground and the wheels 15 are also on the ground. When it is desired to elevate the tower, the motor 25 is operated, and this, by means of the cable 26, pulls the tower up to the desired position.

It will further be noted that when being transported, the tower acts as a connection between the rear wheels 1 and the front wheels 7ª.

In other words the tower in this case acts as the coupling member between the front and rear wheels and is the stress carrying member between the front and rear wheels, the rear wheels and associated frame being pulled along by the tower through its connection to the front wheels. The drum 30 may be provided with a hand crank 30ª so that in emergencies the tower may be lifted and lowered by hand.

I claim:

1. A reconnoitering device comprising a pair of wheels, a frame mounted on said wheels, a tower pivotally connected with said frame, front wheels forming a part of a power unit for transporting said tower with which said tower is removably connected, said frame having a projecting part which projects forwardly, means for connecting said projecting part with the tower, said projecting part adapted to engage the ground when disconnected from the tower so as to act as a partial support for the tower.

2. A reconnoitering device comprising a tower, a frame, a pivot connected with said frame for pivotally connecting one end of the tower therewith, a pinion connected with said pivot, a platform at the other end of said tower, a pivot with which it is pivotally connected with the tower, a beveled gear connected with said pivot, a shaft extending along the tower and having two beveled gears thereon, said beveled gears meshing with the beveled gears on the pivots of the tower and the platform, whereby the platform is kept in a substantially horizontal position in all the positions of the tower.

3. A reconnoitering device comprising a tower, a frame, said tower pivoted at one end to said frame, a platform pivotally connected with the other end of said tower, a shaft carried by said tower, a connection between said shaft and said platform and means for rotating the shaft as the tower is lifted and lowered so as to control the position of said platform.

4. A reconnoitering device comprising rear wheels, a frame mounted thereon, a tower pivotally connected with said frame, front wheels, a connection between said tower and said front wheels, a platform pivotally connected with the front end of the tower, and wheels carried by the front end of said tower, the periphery of said wheels projecting beyond the bottom of said platform so as to engage the ground when the tower is disconnected from the front wheels.

5. A reconnoitering device comprising a tower, a power unit for supplying power to transport and manipulate said tower, a frame to which one end of the tower is pivotally connected, rear wheels for said frame, an upwardly projecting part at one side of said frame, a pulley thereon, a pulley connected with said tower at a point between its ends, a cable connected with the tower and extending over said pulleys, a drum with which said cable is connected, means for rotating the drum to move the tower about its pivotal point after it is mechanically disconnected from the power unit and means for controlling said power from the power unit when the tower is at a distance therefrom, and means separate from the tower moving mechanism for holding said tower in any of its various positions.

Signed at Chicago, county of Cook and State of Illinois, this 11th day of July, 1922.

JOSEPH B. STRAUSS.